UNITED STATES PATENT OFFICE.

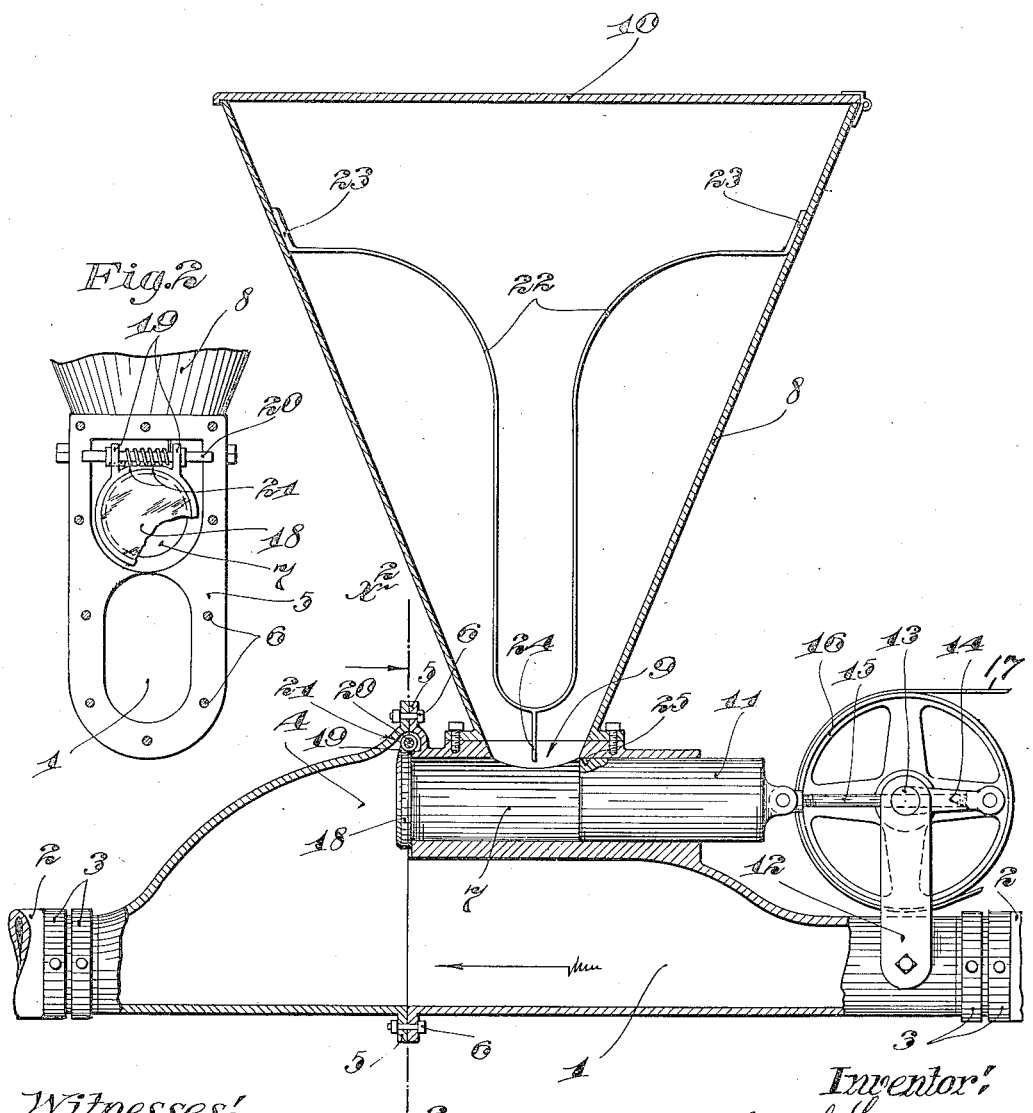

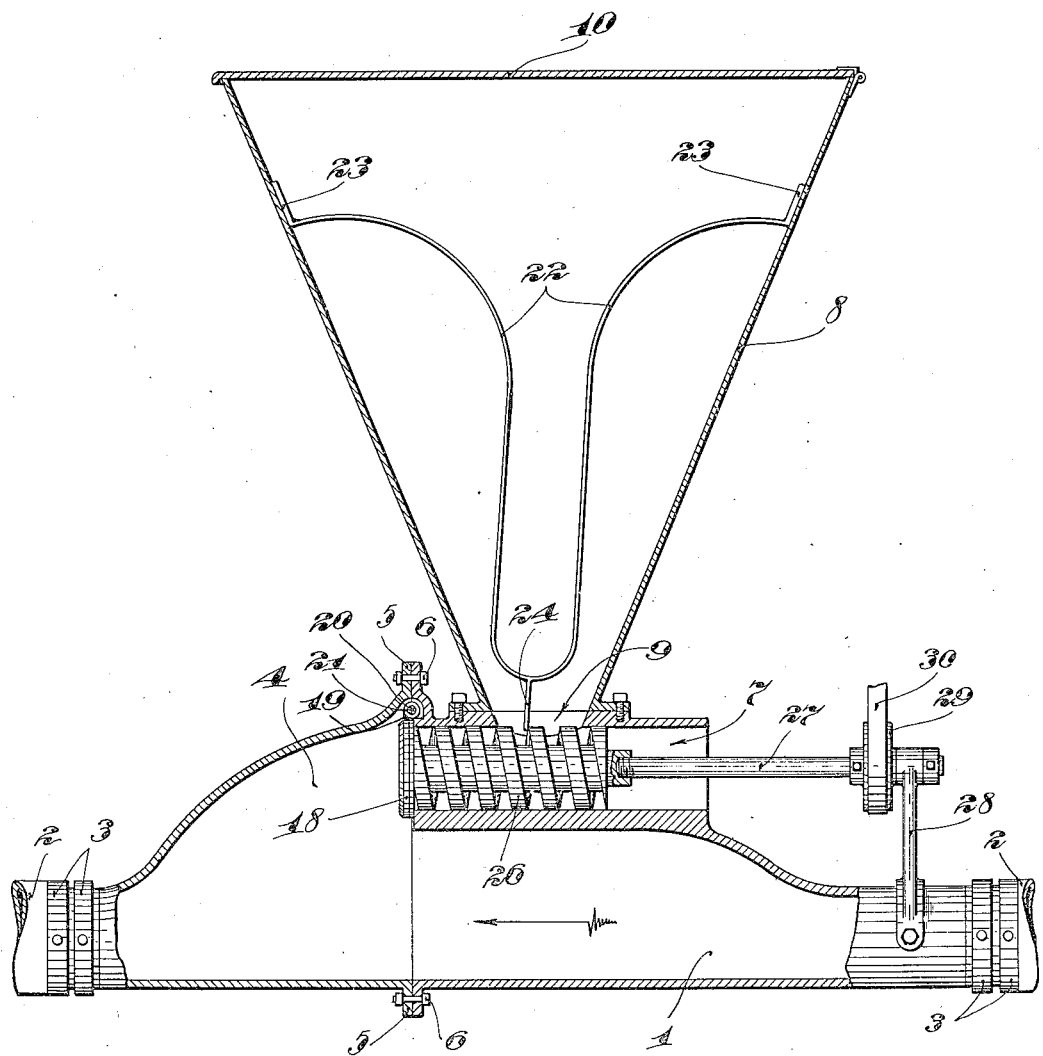

JOSEPH LUNOE, OF MINNEAPOLIS, MINNESOTA.

CHEMICAL FIRE APPARATUS.

1,113,228.  Specification of Letters Patent.  Patented Oct. 13, 1914.

Application filed April 28, 1913. Serial No. 763,992.

*To all whom it may concern:*

Be it known that I, JOSEPH LUNOE, a citizen of the United States, residing at Minneapolis, in the county of Hennepin and State of Minnesota, have invented certain new and useful Improvements in Chemical Fire Apparatus; and I do hereby declare the following to be a full, clear, and exact description of the invention, such as will enable others skilled in the art to which it appertains to make and use the same.

My invention has for its object to provide a simple and efficient fire apparatus of a type adapted for use in charging a stream of water, during its passage through a line of hose, with a chemical agent which will increase the extinguishing properties of the charged stream.

To the above ends, generally stated, the invention consists of the novel devices and combinations of devices hereinafter described and defined in the claims.

In the accompanying drawings, which illustrate the invention, like characters indicate like parts throughout the several views.

Referring to the drawings: Figure 1 is a view partly in longitudinal vertical section and partly in side elevation, showing the preferred form of the invention; Fig. 2 is a transverse vertical section, taken on the line $x^2$ $x^2$ of Fig. 1; and Fig 3 is a view corresponding to Fig. 1 but showing a slightly modified form of the apparatus.

The numeral 1 indicates a metallic tube interposed between two sections of a line of hose 2 and connected thereto, at its ends, by the customary hose couplings 3. The tube 1 is formed with an upwardly extended bulged portion, affording a mixing chamber 4. As shown, this tube 1 is preferably formed in two sections by transversely dividing the same, to afford access to the chamber 4. The abutting ends of said sections are formed with out-turned flanges 5 and are detachably secured together by nut equipped bolts 6, to form a water tight joint. Integrally formed in the upper portion of the rear section of the tube 1 and opening into the chamber 4 is a horizontally extended cylinder 7, open at both ends. Bolted to the top of the cylinder 7 is a chemical holding hopper 8 having an open bottom and arranged to deliver into the cylinder 7 through an opening or port 9 formed in the top thereof. The top of the hopper 8 is preferably closed by a hinged cover 10.

A piston-like feed plunger 11 is mounted in the cylinder 7, for endwise movements to open and close the port 9 and to positively force the chemicals delivered from the hopper 8 into the chamber 4. Bolted to the rear end section of the tube 1 is an upwardly projecting bearing bracket 12, in the upper end of which is journaled a crank shaft 13, having at one end a crank arm 14, connected by a link 15 to the rear end of the plunger 11. Keyed or otherwise secured to the other end of the crank shaft 13 is a pulley 16 over which runs a driving belt 17.

The delivery end of the cylinder 7 is normally closed by a swinging valve 18. This valve 18 is provided with a pair of upwardly projecting hinge lugs 19, pivotally secured to a hinge rod 20 mounted, at its ends, in seats formed between the flanges 5 of the tube 1. The valve 18 is normally held closed, under the action of gravity, and by the pressure of the water within the chamber 4. A coiled spring 21 is also provided for assisting in closing the valve 18. This spring 21 is mounted on the hinge rod 20, between the hinge lugs 19, and the ends thereof react against the valve 18 and the cylinder casting.

Depending into the central portion of the hopper 8 is a vibratory agitator 22 in the form of a U-shaped spring rod having its ends bent laterally outward and anchored at 23, to the opposite sides of the hopper 8. To the intermediate portion of this agitator is secured a depending finger 24, normally projecting centrally through the port 9 and extending a short distance into the cylinder 7. As the plunger 11 moves forward, the finger 24 is engaged by the front end of the plunger 11 and, together with the agitator 22, is moved to one side of the hopper 8. During this movement of the agitator 22, the lower end of the finger 24 is lifted high enough to permit the forward end of the plunger 11 to pass thereunder. During the return movement of the plunger 11, the finger 24 is engaged by a V-shaped notch 25, cut in the top of the plunger 11 and moved, together with the agitator 22, to the other side of the hopper 8. In this position of the plunger, the finger 24 will have moved to a point high enough to be lifted out of the notch 25, thereby releasing the agitator 22 and, under its spring tension, will vibrate back and forth in the chemicals within the hopper 8 and then assume its normal or central position. This agitation of the chemicals within the hopper 8 will loosen the same and thereby cause the chemicals to settle in the bottom of the hopper 8, to insure a steady feed.

When the plunger 11 is in its extreme rear position, as shown in Fig. 1, the port 9 is open and a quantity of the chamicals within the hopper 8 will drop into the cylinder 7 through said port. During the advance movement of the piston 11, the chemicals within the cylinder 7 will be forced out of the delivery end of the cylinder 7 into the chamber 4, where the same are thoroughly commingled with the water and carried thereby through the hose in the direction of the arrow marked on Fig. 1. The pressure of the chemicals on the valve 18, under the action of the plunger 11, will open said valve against the pressure of the water within the chamber 4. As the plunger 11 starts on its return movement, the valve 18 will be closed, under the action of gravity and the pressure of the water, together with the spring 21. During the discharge of the chemicals from the cylinder 7 by the plunger 11, the port 9 is completely closed by said plunger and is not uncovered until after the valve is closed, following the discharge of the chemicals from the cylinder, thereby preventing the water from coming in contact with the main body of chemicals in the hopper 8.

In actual practice, the improved apparatus will be mounted on a hose wagon or suitable truck, which will be provided with an explosive engine or other suitable means for operating the plunger 11. In case an explosive engine is used, the engine shaft will be provided with a driving pulley over which the belt 17 runs. In some instances, it might be desirable to operate the plunger 11 by a hand crank. It might sometimes be desirable to mount the improved apparatus on a fire engine; in which case, the plunger 11 will be driven from one of the operative parts of the engine.

Referring to the modification shown in Fig. 3, the numeral 26 indicates a heavy feed screw having a square thread and mounted in the cylinder 7, for positively forcing the chemicals from the hopper 8 into the chamber 4. This feed screw 26 is provided with a rearwardly extended shaft 27 journaled, at its rear end, in a bearing 28, bolted to the rear end section of the tube 1. Secured for rotation with the shaft 27 is a pulley 29, over which runs a driving belt 30. In this structure, the valve 18 operates in the same manner as previously described and the chemicals packed within the thread of the feed screw 26 will prevent an inrush of water from the chamber 4 to the hopper 8 while the valve 18 is open.

The above described device, while extremely simple and of comparatively small cost to manufacture, is thought to be highly efficient for the purpose had in view.

What I claim is:

1. In an apparatus of the kind described the combination with a water conduit having a chemical receiving section of very greatly increased cross-section of a cylinder expanded approximately parallel to said conduit, having its inner end opening into the expanded section thereof, leaving the said conduit with at least its full, conducting capacity in the vicinity thereof, a yieldingly closed check valve normally closing the inner end of said cylinder and adapted to open into the expanded section of said conduit, a hopper opening into the intermediate portion of said cylinder, and a positive feed device working in said cylinder, for forcing the chemicals into said expanded chamber of said conduit to chemicalize the water therein.

2. In an apparatus of the kind described the combination with a water conduit, of a cylinder having a discharge end opening into said conduit, a hopper delivering into the intermediate portion of said cylinder, a check valve normally closing the delivery end of said cylinder, a reciprocating plunger working in said cylinder and having a notch therein, and an agitator within said hopper depending into said cylinder and arranged to be intermittently engaged by one end of said plunger and said notch for moving said agitator with said plunger in either direction of travel thereof.

In testimony whereof I affix my signature in presence of two witnesses.

JOSEPH LUNOE.

Witnesses:
   EDITH E. HANNA,
   HARRY D. KILGORE.